United States Patent
Calmettes et al.

(10) Patent No.: US 8,290,484 B2
(45) Date of Patent: Oct. 16, 2012

(54) METHOD OF RECOVERING A SIGNAL FROM A SET OF SIGNALS COLLECTED BY SATELLITE

(75) Inventors: Thibaud Calmettes, Toulouse (FR); Rémi Challamel, Toulouse (FR)

(73) Assignee: Thales, Neuilly sur Seine (FR)

( * ) Notice: Subject to any disclaimer, the term of this patent is extended or adjusted under 35 U.S.C. 154(b) by 58 days.

(21) Appl. No.: 13/029,946

(22) Filed: Feb. 17, 2011

(65) Prior Publication Data

US 2011/0207398 A1 Aug. 25, 2011

(30) Foreign Application Priority Data

Feb. 19, 2010 (FR) ...................................... 10 00702

(51) Int. Cl.
*H04W 4/00* (2009.01)
(52) U.S. Cl. ........ 455/427; 455/423; 455/424; 455/425; 455/98; 455/13.2; 370/316; 370/350
(58) Field of Classification Search .......... 455/423–425, 455/427–431, 12.1, 13.2, 98; 370/316, 350
See application file for complete search history.

(56) References Cited

U.S. PATENT DOCUMENTS 6,603,803 B1 * 8/2003 Hatch ............................ 375/150
7,856,232 B2 12/2010 Nasta et al.
2003/0064745 A1 * 4/2003 Benveniste ................... 455/522
2006/0252368 A1 11/2006 Karabinis
2009/0161797 A1 6/2009 Cowles et al.

FOREIGN PATENT DOCUMENTS

EP 2 093 889 A1 8/2009

* cited by examiner

*Primary Examiner* — Wayne Cai
(74) *Attorney, Agent, or Firm* — Baker & Hostetler LLP

(57) ABSTRACT

A method of recovering a useful signal received by a satellite includes a step of reception by the satellite of a composite signal comprising said useful signal and collision signals, all of these signals being received simultaneously by the satellite, interfering with each other, and respectively being transmitted by transmitters. The method includes the steps of: direct reception, by at least one station of a terrestrial network, of signals corresponding to at least a non-zero portion of said collision signals and referred to as collected collision signals; for each collected collision signal, estimation, by a processing unit connected to the terrestrial network and to the satellite, of the collision signal received by the satellite as a function of (i) the collected collision signal received directly by the terrestrial station, (ii) the position of the transmitter at the time of transmission of this collision signal, and (iii) the position of the satellite during the reception of the composite signal; and extraction of the collected and estimated collision signals, from the composite signal, in order to allow recovery of the useful signal.

9 Claims, 1 Drawing Sheet

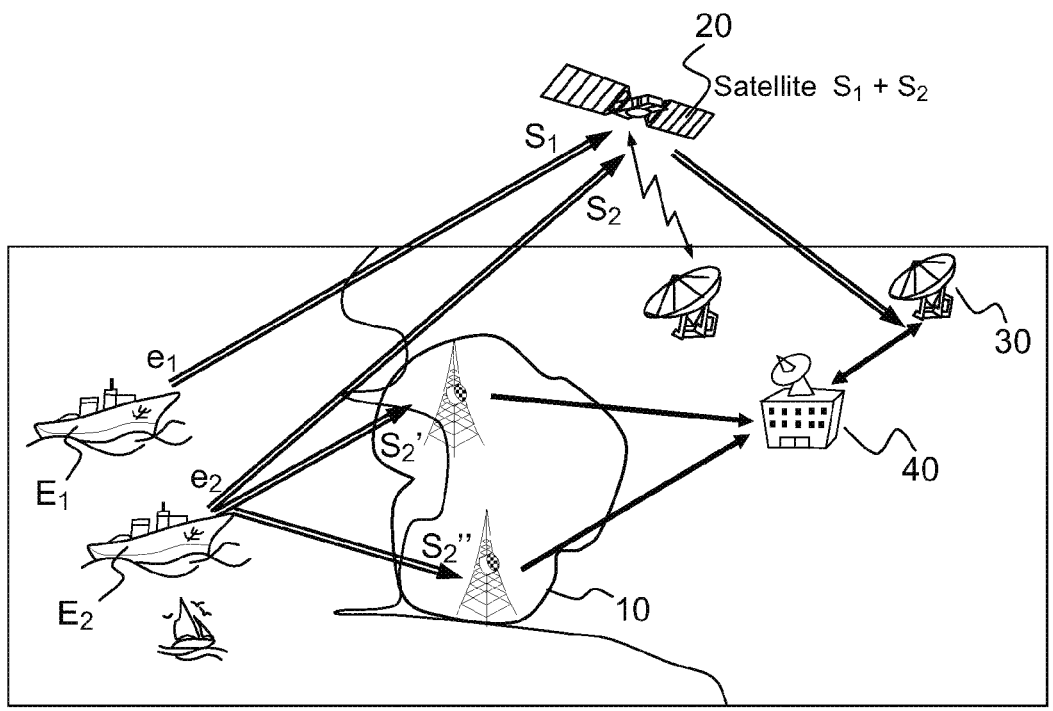

METHOD OF RECOVERING A SIGNAL FROM A SET OF SIGNALS COLLECTED BY SATELLITE

CROSS-REFERENCE TO RELATED APPLICATION

This application claims priority to foreign French patent application No. FR 1000702, filed on Feb. 19, 2010, the disclosure of which is incorporated by reference in its entirety.

TECHNICAL FIELD

The field of the invention is that of satellite communications. More specifically, it relates to reducing or even eliminating the effect of collisions of signals received simultaneously by the satellite and which make their demodulation impossible.

BACKGROUND

This problem notably appears with a communication system such as the Automatic Identification system, also known by its acronym AIS. The AIS is a system of automated exchanges of messages between ships by radio which makes it possible to limit collisions between ships and which allows surveillance of maritime traffic in sight of coasts by means of coastal stations which listen to the exchanged communications. The collection of this data by satellite allows maritime surveillance far from coasts and a verification of the data transmitted by analysis of the received signal. The AIS messages, which are transmitted in a public manner, contain the position of the transmitting ship, as well as its identifier, its heading, its speed, etc.

When messages (or signals) are transmitted by ships sailing in dense zones such as the Mediterranean or along coasts, there is then a high probability of mutual blocking of signals on reception in the satellite. In fact, the workload of the input circuits of the receiver of a satellite is such that on average about twenty signals arrive simultaneously at the receiver, which makes their demodulation impossible.

In order to allow the satellite AIS to have acceptable performance, taking account of the performance requirements for maritime safety, it is necessary to limit said mutual blockages (that is to say the probability that several signals are received at the same time) or at least to limit their effect.

The currently examined solutions which make it possible to limit the collisions are of two orders:

- modification of the system: one solution proposes modifying the transmitters of the ships in order to add a channel to them and defining a new protocol for transmitting a message which is more suited to spatial monitoring. This solution however has a high cost and a long period of deployment, and it could be bypassed by transmitting different messages on the conventional AIS channels and the Satellite AIS channels;
- modification of the receiver: a large portion of the collisions of signals can be eliminated by using on-board receivers that are more complex both in terms of antenna systems and in terms of processing. This solution is however costly in payload complexity and most often in the complexity of the ground segment of the satellite task.

Consequently, at present there is still a need for a system simultaneously satisfying all of said requirements, namely elimination of the effects of the collisions on the signals actually transmitted without a drastic increase in the complexity of the satellite payload.

SUMMARY OF THE INVENTION

The invention recreates the signals received by the ground stations such as they have been seen by the satellite and extracts these signals from the composite signal collected by the satellite in order to eliminate the major portion of the collision signals and to retain only the signal not seen by a ground station.

More precisely, the subject of the invention is a method of recovering a useful signal received by a satellite which comprises a step of reception by the satellite of a composite signal comprising said useful signal and any number of so-called collision signals, all of these signals being received simultaneously by the satellite, interfering with each other, and respectively being transmitted by transmitters. It is principally characterized in that it comprises the following steps:

direct reception, by at least one station of a terrestrial network, of signals corresponding to at least a portion of said collision signals and referred to as collected collision signals, for each collected collision signal, estimation, by a processing unit connected to the terrestrial network and to the satellite, of this collision signal received by the satellite as a function of:
  i. the collected collision signal received directly by the terrestrial station,
  ii. the position of the transmitter at the time of transmission of this collision signal, and
  iii. the position of the satellite during the reception of the composite signal, extraction of the collected and estimated collision signals, from the composite signal, in order to allow the recovery of the useful signal.

The position of the transmitter can be included in the signal coming from that transmitter or be calculated by the processing unit.

In certain cases, the useful and collision signals are transmitted such that they are synchronized on a fixed time according to a positioning system.

The useful and collision signals are for example signals of the AIS or of the ARGOS or of the mobile telephony type.

According to a feature of the invention, the time of transmission of the signal is estimated by the processing unit.

The terrestrial network can be either an existing coastal terrestrial system such as the AIS one, or a terrestrial network to be deployed such that it is placed higher (mountain, hill) in order to provide greater visibility over the maritime zone.

When only a portion of the collision signals has been extracted from the composite signal, the method furthermore possibly comprises a processing step allowing the elimination of the residual collision signals.

BRIEF DESCRIPTION OF THE DRAWING

Other features and advantages of the invention will appear on reading the following detailed description, given by way of non-limiting example and with reference to FIG. 1 which is a diagrammatic representation of a satellite data collecting system.

DETAILED DESCRIPTION

Numerous data collecting systems are at present used for various purposes: study of fauna, of the environment, ship's distress beacon, maritime traffic surveillance system, etc. The Argos system, which has been operational since 1979, is a well-known example of them. There are however other data collecting systems such as the AIS (Automatic Identification System) or the SAR (Search And Rescue) systems for example. The operating principle of a data collecting system is shown in a general manner in FIG. 1.

Thus, in this diagram, data collecting devices equip, for example, an animal population, meteorological buoys or a fleet of fishing boats. The measurements made by these devices are encapsulated within signals e1, e2, . . . , transmitted by the intermediary of adapted transmitter devices E1, E2, . . . , to satellites 20. Said satellites 20 return these signals, possibly modified, and possibly accompanied by measurements on the received signal S1, S2, . . . , to receiving stations 30 on the ground. The latter relay the signals to ground stations 40 which have suitable processing means making it possible, for example, to approximately locate the objects of a study or of a surveillance. After processing the signals transmitted by the satellites 20 and the receiving stations 30, the ground stations 40 can transmit information messages to a network of users.

Moreover, a portion of the signals, in this case e2, e3, e4, . . . , respectively transmitted by the transmitters E2, E3, E4, . . . , can also be received by terrestrial stations, such as is the case in the AIS in order to provide coastal maritime surveillance.

The set of receiving stations 30 on the ground receiving the signals returned by the satellites is called the ground segment of the satellite task; the set of coastal stations receiving directly the signals transmitted by the transmitters E1, E2, E3, E4, . . . , is called the coastal or terrestrial network 10. The ground stations 40 are connected, on the one hand, to the satellite task ground segment and, on the other hand, to the terrestrial network 10.

The method of recovering the useful signal in the context of a satellite AIS system will now be described in detail.

The satellite 20 simultaneously receives several signals which interfere with each other in order to form a composite signal S1+S2+S3+S4+ . . . . Among these signals, there is a signal called the useful signal and referenced S1, the other signals S2, S3, S4, . . . being called collision signals. These signals S1, S2, S3, S4, . . . correspond to the signals e1, e2, e3, e4, . . . respectively transmitted by transmitters E1, E2, E3, E4, . . . , possibly mobile.

Moreover, one or more coastal stations, more generally called terrestrial stations, directly receive the signals e2, e3, e4, . . . transmitted by the transmitters E2, E3, E4, . . . corresponding to the collision signals S2, S3, S4, . . . received by the satellite; these signals received by this coastal station are referenced S2', S3', S4', . . . , and referenced S2", . . . when they are received by another coastal station. The signal e1 transmitted by E1 is not received by a coastal station because, for example, of its distance.

The coastal network 10 can be either the existing terrestrial AIS network, or a terrestrial network to be deployed and positioned higher (mountain, hill) in order to provide greater visibility over the maritime zone.

The signals respectively transmitted by the transmitters E1 and E2 are of the form:

$$e_1(t) = A_{e1} \cos(\omega_{e1} t + \phi_{e1} + \alpha_1(t)),$$

$$e_2(t) = A_{e2} \cos(\omega_{e2} t + \phi_{e2} + \alpha_2(t)),$$

$A_e$ being the amplitude, $\omega_e$ the angular frequency, $\phi_e$ the initial phase and $\alpha$ the modulation of the signal.

The angular frequencies $\omega_{e1}$ and $\omega_{e2}$ can be different but are sufficiently close to generate disturbing interferences.

On reception by the satellite 20, these signals have the form:

$$S1(t) = A_1 \cos(\omega_1 t + \phi_1 + \alpha_1(t)),$$

$$S2(t) = A_2 \cos(\omega_2 t + \phi_2 + \alpha_2(t)).$$

The signal $e_2(t)$ transmitted by E2 is also received by a coastal station of the terrestrial network 10: this received signal S2'(t) is of the form:

$$S2'(t) = A'_2 \cos(\omega'_2 t + \phi'_2 + \alpha_2(t)).$$

The signal S2(t) received by the satellite is estimated (and referenced Ŝ2) by a processing unit of a ground station 40, on the basis of:
  the signal S2'(t) received by a coastal station of the terrestrial network 10,
  the position of the transmitter E2 at the time of transmission of its signal $e_2(t)$ and
  the position of the satellite 20 at the time of reception of the signal S2(t) provided from the ephemeris of the satellite.

In order to reconstruct the signal Ŝ2 "as seen by the satellite", a dating measurement of the signal S2' received on the ground and the position information of the transmitter is used in particular. In the case of the AIS, these two tasks are greatly facilitated by the fact that a positioning system (typically GPS) is associated with the AIS transmitter, such that the transmission of the signals is synchronized with the time of the positioning system and that the transmitted signal contains the position of the transmitter as estimated by this positioning system.

The following is obtained: $\hat{S}2 = \hat{A}_2 \cos(\hat{\omega}_2 t + \hat{\phi}_2 + \alpha_2(t))$.

The same applies to the other collision signals S3, . . . which are also estimated. Ŝ3, . . . are therefore also obtained.

Then these estimated collision signals are eliminated from the composite signal received by the satellite by calculating:

$$S1 + S2 + S3 + \ldots - \hat{S}2 - \hat{S}3 - \ldots \approx S1.$$

The useful signal S1 received by the satellite 20 has thus been recovered.

It is not necessary to process, or even to collect, all of the collision signals. For example, if in the case of three signals only the signal S2 has been collected and estimated, it will be possible to apply the invention by proceeding as follows:

$$S1 + S2 + S3 - \hat{S}2 \approx S1 + S3.$$

It is possible that the recovery of S1 from S1+S3 can be carried out by other methods, such as joint demodulation methods.

Estimating the collision signal S2 amounts to determining:
  the angular frequency of the carrier $\omega_2$,
  the modulation $\alpha_2(t)$,
  the initial phase $\phi_2$,
  the power, that is to say the amplitude A2.

This evaluation is described here in the satellite AIS case.

In order to allow the demodulation of the useful (not eliminated) signal with good performance, it is considered that the collision signals must be eliminated with a residue of less than 20 dB below the useful signal.

Attention is firstly given to the angular frequency $\omega$.

There are two contributions to this angular frequency: the offset of the central frequency of the ship, fixed in time, in a range of +/−500 Hz with respect to the centre of the band, and the Doppler shift. On the transmission $e_2$, the Doppler shift can be estimated from the speed and the heading of the ship supplied in the signal, and the estimation of the central transmission frequency could therefore by carried out using a single measurement during the reception by the terrestrial station. No frequency measurement is however carried out at present in the coastal terrestrial network, and these measurements should be replaced by the creation and updating by iteration of a table of central frequencies of each ship. For the Doppler shift due to the satellite, considering the worst case of a ship (E2 or E3) at the nadir, with a position error of 20 m, an error in the Doppler estimated on board the satellite of 0.12 Hz will be obtained, giving a phase shift of 0.014 rad over the whole of the signal, or a residue of −37 dB which is well below the threshold of −20 dB mentioned above.

The modulation a of the collision signal received by the satellite is the same as that of the collision signal received by a ground station.

With regard to the synchronisation, it is recalled that the transmissions of signals from the ships that are in a same maritime zone are carried out according to a multiplexing method based on the allocation of TDMA time slots. In order to have an initial phase residue $\phi$ of −20 dB, it is necessary to have a synchronization error of 0.6% of the duration of a bit, giving, at 9600 bits/s, a synchronization error of 0.66 µs. As the transmissions from the ships are synchronized with the GPS time (with an accuracy of the order of 50 ns), the ground segment (the stations 30) only have to remove the ambiguity of the transmission slot. The only source of error is therefore the uncertainty of the propagation time between the ship and the satellite receiver, with a tolerance of 200 m. The positioning accuracy of the ship is much better than this threshold. In fact, for a positioning error of 20 m, the initial phase residue is −30 dB, which is well below the threshold of −20 dB mentioned above.

The amplitude A of the signal can be estimated by a link budget, knowing the antenna characteristics of the transmitter (ship) and of the receiver (satellite), as well as their positions at the time of transmission and of reception.

It has thus been shown that the method according to the invention makes it possible to eliminate the collision signals with good performance.

This method also applies to ARGOS signals, the transmitters E1, E2, E3, . . . then generally being ARGOS beacons. The signal transmitted by a beacon also contains the position of the beacon. In the case of Argos, the signals are not transmitted in synchronism with the positioning system and it is therefore appropriate to add an accurate measurement of the time of arrival in the coastal station.

The method also applies in the case of satellite mobile telephony. However, the position of the transmitter, that is to say of the mobile telephone, is not included in the transmitted signal. It can then be calculated by the processing unit by triangulation using the collision signal directly received by at least two terrestrial stations: S2' and S2" in the figure.

The invention claimed is:

1. A method of recovering a useful signal received by a satellite which comprises a step of reception by the satellite of a composite signal comprising said useful signal and so-called collision signals, all of these signals being received simultaneously by the satellite, interfering with each other, and respectively being transmitted by transmitters, said method comprising the steps:
    direct reception, by at least one station of a terrestrial network, of signals corresponding to at least a non-zero portion of said collision signals and referred to as collected collision signals;
    for each collected collision signal, estimation, by a processing unit connected to the terrestrial network and to the satellite, of this collision signal received by the satellite as a function of:
      i. the collected collision signal received directly by the terrestrial station,
      ii. the position of the transmitter at the time of transmission of this collision signal, and
      iii. the position of the satellite during the reception of the composite signal; and
    extraction of the collected and estimated collision signals, from the composite signal, in order to allow recovery of the useful signal.

2. A method of recovering a useful signal received by a satellite according to claim 1, wherein the position of the transmitter is included in the signal coming from that transmitter.

3. A method of recovering a useful signal received by a satellite according to claim 1, wherein the useful and collision signals are transmitted such that they are synchronized on a fixed time according to a positioning system.

4. A method of recovering a useful signal received by a satellite according to claim 1, wherein the useful and collision signals are AIS signals.

5. A method of recovering a useful signal received by a satellite according to claim 1, wherein the useful and collision signals are ARGOS signals.

6. A method of recovering a useful signal received by a satellite according to claim 1, wherein the position of the transmitter is estimated by the processing unit.

7. A method of recovering a useful signal received by a satellite according to claim 6, wherein the useful and collision signals are mobile telephony signals.

8. A method of recovering a useful signal received by a satellite according to claim 1, wherein the time of transmission of the signal is estimated by the processing unit.

9. A method of recovering a useful signal received by a satellite according to claim 1, wherein only a portion of the estimated collision signals has been extracted from the composite signal, and further comprising a processing step allowing the elimination of the residual collision signals.

\* \* \* \* \*